2,999,118
PREPARATION OF TRICHLORO NITRO ALCO-
HOLS AND TRICHLORO NITRO ALKENES
Gustave B. Bachman and Norman W. Standish, West
Lafayette, Ind., assignors to Purdue Research Founda-
tion, Lafayette, Ind., a corporation of Indiana
No Drawing. Filed Apr. 22, 1959, Ser. No. 808,018
4 Claims. (Cl. 260—633)

Our invention relates to an improved process for the production of trichloro nitro alkenes and trichloro nitro alcohols, and more particularly, to the vapor phase interaction of primary aliphatic nitro alkanes and chloral in the presence of magnesium sulfate and an amine selected from the group consisting of tertiary aliphatic amines containing up to six carbon atoms and compounds which decompose under reaction conditions to form tertiary aliphatic amines having up to six carbon atoms.

Previously, Chattaway, et al., Journal of the Chemical Society, 1936, page 1294, prepared trichloro nitro- alcohols by reacting chloral and nitro alkanes in the liquid phase at 40–70° C. and in the presence of sodium sulfite or sodium carbonate catalysts.

We have now discovered that trichloro nitro alcohols and trichloro nitro alkenes can be prepared by a rapid continuous process in the vapor phase when chloral is interacted with primary nitro alkanes in the presence of magnesium sulfate and catalytic amounts of a tertiary aliphatic amine containing up to six carbon atoms or compounds which decompose under reaction conditions to form tertiary aliphatic amines containing up to six carbon atoms.

The nitro alkane which are operative in our process include 1-nitroethane, 1-nitropropane, 1-nitro-2-methylpropane, 1-nitrobutane, 1-nitrohexane, 1-nitrononane, 1-nitroundecane, 1-nitropentadecane, etc.

The chloral which we use in our process can be either pure chloraldehyde or chloral hydrate. We prefer to utilize the more available chloral hydrate.

Two catalysts are required in our process, as indicated above. Magnesium sulfate is one of the required catalysts. The catalyst may be pure magnesium sulfate or the magnesium sulfate may be deposited upon support materials such as silica gel, asbestos, fire brick and tile. We prefer to impregnate a catalyst support with magnesium sulfate, as pure magnesium sulfate quickly deteriorates under the reaction conditions of our process. In a continuous process the activity of the magnesium sulfate catalyst may be maintained by continually adding small amounts of fresh magnesium sulfate to the reaction mixture. Of the many catalyst supports tested, a commercial product known as "Suntile," a highly porous tile manufactured by the Cambridge Tile Company, of Cincinnati, Ohio, was found to have maximum utility in our process.

The organic catalysts which form a part of our catalyst mixture are tertiary aliphatic amines having up to six carbon atoms and ammonium compounds which decompose under reaction conditions to form these compounds in situ. Such amine catalysts include, for example, trimethylamine, triethylamine, monomethyldiethylamine, monoethyldimethylamine, monopropyldimethylamine, etc. Among the compounds which decompose under reaction conditions to give the tertiary aliphatic amines described above are benzyltrimethylammonium hydroxide, benzyltriethylammonium hydroxide, etc. The concentration of organic base in the reaction mixture can range from about 0.2 to 7.5 mole percent. We prefer to prepare our trichloro nitro alcohols and our trichloro nitro alkenes using from about 0.75 to 1.5 mole percent amine.

We prefer to utilize triethylamine as the organic catalyst in our process due to the fact that we can obtain maximum yields when using this catalyst, though good yields are also obtained when the other catalysts of our invention are used.

The temperature at which the reaction is carried out is very important. At temperatures below about 275° C. and at temperatures above about 400° C. the yields of trichloro nitro alcohol and trichloro nitro alkene decline from the optimum. We prefer to utilize temperatures of about 360° C. as we have found that optimum yields are obtained at these temperatures.

Good yields of trichloro nitro alcohols and trichloro nitro alkenes are obtained when from about 1:0.5 to 1:5 molar ratios of chloral to nitro alkane are used in our process. We prefer, however, to utilize a slight excess of nitro alkane on the order of 1:1 to 1:1.5 moles of chloral to primary nitro alkane, as we have found that we obtain slightly better yields at these molar concentrations.

The following examples more fully illustrate our invention. It is not intended that our invention be limited to the products, processes, etc., set out but rather it is intended that all equivalents obvious to those skilled in the art be included within the scope of our invention as claimed.

Example I

Chloral hydrate, 82.7 grams (0.5 mole) and nitroethane, 45.0 grams (0.6 mole), were mixed, warmed and stirred until homogeneous. The mixture was cooled and triethylamine, 1.0 gram (0.01 mole), was added and the solution stirred. The mixture was passed into the reactor through a dropping funnel. The funnel was attached to the reactor by means of a ground glass joint. The reactor was constructed from a 16 mm. x 122 cm. Pyrex tube having catalyst supporting indentations at its lower end. The reactor contained a thermocouple which was sealed in a 6 mm. Pyrex tube and suspended in the reaction chamber so that all temperature readings could be taken from the middle of the column. The lower end of the reactor was sealed to a 20 mm. x 20 cm. Pyrex tube which served as an air condenser. The condenser was attached in turn to an ice-cooled collecting flask. The reactor was filled with magnesium sulfate-impregnated "Suntile," prepared by placing about 200 g. of "Suntile," broken into about one-fourth inch pieces, into a 100 cc. water solution of 25 grams of magnesium chloride, and allowed to soak for several days. Sulfuric acid was added to form magnesium sulfate. The mixture was evaporated to dryness and the residual pieces were washed with dilute ammonium hydroxide in water and dried at 350° C. The reactor was electrically heated to 370° C. during the reaction period. The liquid product emerging from the reactor was taken up in ether, washed with dilute aqueous sodium bicarbonate and water and dried over anhydrous magnesium sulfate. Distillation yielded 1,1,1-trichloro-3-nitro-2-butene, 9.4 grams (9.2% conversion based on nitropropane) and 1,1,1-trichloro-3-nitro-2-butanol), 28.4 g. (25.6% conversion based on nitropropane).

Example II

Chloral hydrate, 165.4 g. (1 mole), and nitropropane, 106.9 g. (1.2 mole), were mixed and warmed on a steam cone until homogeneous. After cooling, triethylamine, 2 g. (0.02 mole), was added to the mixture. The mixture was slowly passed through the reactor of Example I containing magnesium sulfate supported on "Suntile" and maintained at 350° C. The product emerging from this reactor was taken up in ether, washed with dilute aqueous sodium bicarbonate and water and dried over anhydrous sodium sulfate. Distillation yielded 1,1,1-trichloro-3-nitro-2-pentene, 9.4 g. (4.3% conversion based on nitropropane) and 1,1,1-trichloro-3-nitro-2-pentanol, 88 g. (37.3% conversion based on nitropropane), B.P. 80–112° C. (2 mm.), $n_D^{20}$ 1.4942.

*Example III*

Into the reactor of Example I containing asbestos impregnated with magnesium sulfate and maintained at a temperature of 360° C. a mixture of 1 mole of chloral hydrate, 1.2 mole of nitrobutane and 1.2 g. (0.02 mole) of trimethylamine was slowly introduced over a 45 minute period. A 44% yield, based on nitrobutane, of 1,1,1-trichloro-3-nitro-hexanol was recovered.

*Example IV*

Into the reactor of Example I containing fire brick impregnated with magnesium sulfate was incrementally introduced a mixture of 1 mole of chloral, 1.2 mole of nitromethane, and 0.02 mole of benzyltriethylammonium hydroxide. The reactor waas maintained at 370° C. throughout the reaction period and a yield of 49% 1,1,1-trichloro-3-nitro-2-propanol was recovered.

*Example V*

Following the process of Example I, chloral and 1-nitropentadecane were interacted to yield 1,1,1-trichloro-3-nitro-2-heptadecanol.

Our compounds have utility in weed control, and as inhibitors against the development of rancid odors in stored alkaryl sulfonates suitable for wetting or emulsifying agents. Our compounds also have bactericidal activity, as indicated by the following table wherein the listed compounds were tested against the listed microorganisms.

| Test Culture | Minimal Inhibitory Concentration, μg./ml. | | | |
|---|---|---|---|---|
| | P-1403 [1] | P-1405 [2] | P-1406 [3] | P-1407 [4] |
| *M. pyogenes* var. *aureus* | 250–500 | 250–500 | 250–500 | 1,000 |
| *S. faecalis* | 250–500 | 250–500 | 100–250 | 1,000 |
| *S. hemolyticus* | 250–500 | 100–250 | 100–250 | 500–1,000 |
| *E. coli* | 1,000 | 500–1,000 | 250–500 | 1,000 |
| *P. pseudotuberculosis* | 250–500 | 100–250 | 100–250 | 250–500 |
| *S. dysenteriae* | 1,000 | 500–1,000 | 250–500 | 1,000 |
| *P. aeruginosa* | 1,000 | 1,000 | 500–1,000 | 500–1,000 |
| *M. ranae* | 250–500 | 100–250 | 100–250 | 500–1,000 |

[1] 3,3,3-trichloro-1-nitropropene.
[2] 1,1,1-trichloro-3-nitro-2-hexanol.
[3] 1,1,1-trichloro-3-nitro-2-butene.
[4] 1,1,1-trichloro-3-nitro-2-butanol.

Now having described our invention what we claim is:

1. A process for the manufacture of trichloro nitro alcohols and trichloro nitro alkenes which comprises contacting vapors of 1-nitro alkanes with chloral at temperatures ranging from about 275° C. to about 400° C. in the presence of magnesium sulfate and from about 0.2 to about 7.5 mole percent, based on the total weight of the reactants, of a tertiary aliphatic amine containing up to 6 carbon atoms.

2. A process for the introduction of trichloro nitro alcohols and trichloro nitro alkenes which comprises contacting vapors of 1-nitro alkanes with chloral at temperatures of about 360° C. in the presence of magnesium sulfate and from about 0.2 to about 7.5 mole percent, based on the total weight of the reactants, of a tertiary aliphatic amine containing up to 6 carbon atoms.

3. In a process for the vapor phase reaction of chloral and 1-nitro alkanes the steps which consist of contacting a 1-nitroalkane having up to three carbon atoms with chloral at temperatures ranging from about 275° C. to about 400° C. in the presence of magnesium sulfate and from about 0.2 to about 7.5 mole percent, based on the total weight of the reactants, of a tertiary aliphatic amine containing up to 6 carbon atoms and recovering the trichloro nitro alkene and trichloro nitro alcohol formed.

4. A process for the production of 1,1,1-trichloro-3-nitrobutanol which comprises contacting vapors of nitroethane with vapors of chloral at temperatures of about 360° C. in the presence of magnesium sulfate and from about 0.2 to about 7.5 mole percent based on the total weight of the reactants, of a tertiary aliphatic amine containing up to 6 carbon atoms and recovering the trichloro nitro alkene and trichloro nitro alcohol formed.

References Cited in the file of this patent

UNITED STATES PATENTS

| | | |
|---|---|---|
| 2,132,330 | Vanderbilt | Oct. 4, 1938 |
| 2,298,375 | Hasche | Oct. 13, 1942 |
| 2,895,869 | Bluestone | July 21, 1959 |

OTHER REFERENCES

Malkiel et al., J. Am. Chem. Soc., vol. 64, page 2515 (1942).